J. T. WICKER.
NUT LOCK.
APPLICATION FILED JULY 13, 1914.
1,119,334.  Patented Dec. 1, 1914.
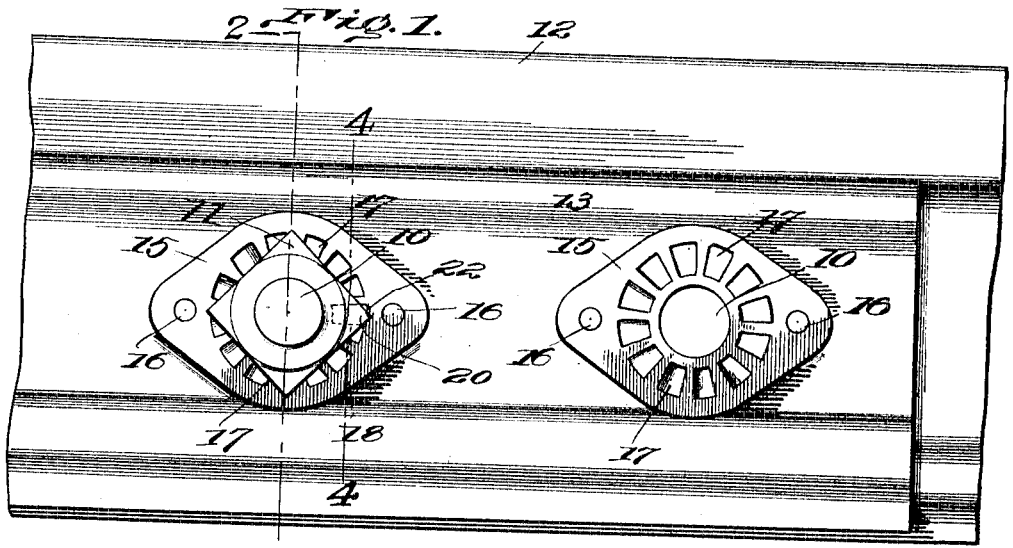
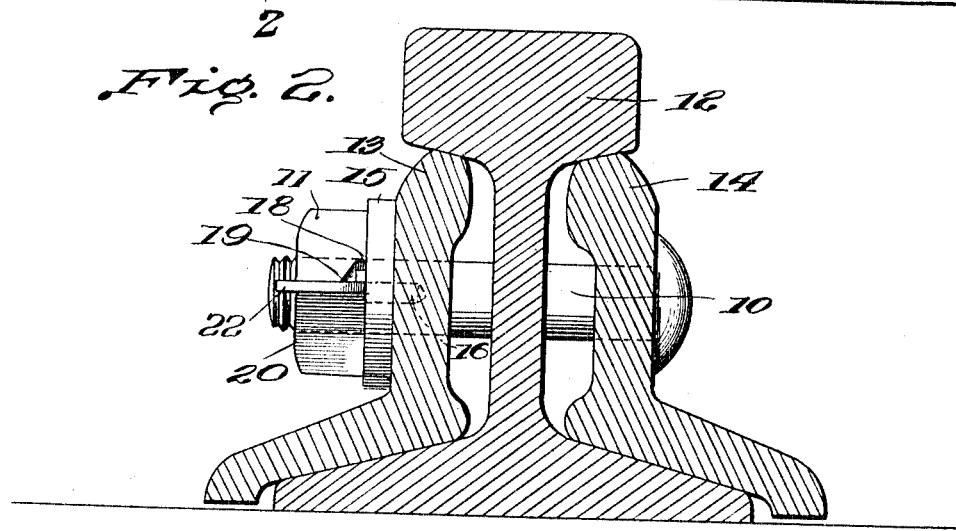
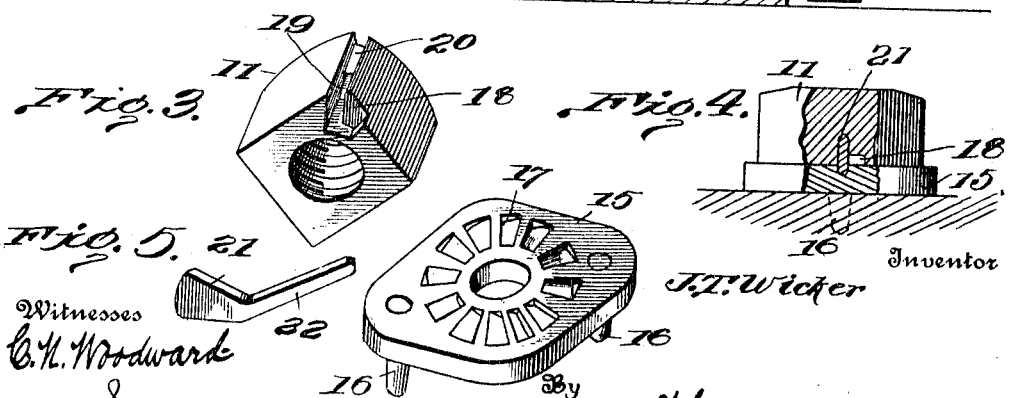
Inventor
J. T. Wicker

UNITED STATES PATENT OFFICE.

JOHN T. WICKER, OF SPRAGUE, WASHINGTON, ASSIGNOR OF ONE-HALF TO J. J. GARRELTS, OF SPRAGUE, WASHINGTON.

NUT-LOCK.

1,119,334.  Specification of Letters Patent.  Patented Dec. 1, 1914.

Application filed July 13, 1914. Serial No. 850,759.

*To all whom it may concern:*

Be it known that I, JOHN T. WICKER, citizen of the United States, residing at Sprague, in the county of Lincoln and State of Washington, have invented certain new and useful Improvements in Nut-Locks, of which the following is a specification.

This invention relates to improvements in devices for preventing the retrograde movement of nuts upon bolts, and has for one of its objects to simplify and improve the construction and increase the efficiency and utility of devices of this character.

Another object of the invention is to provide a simply constructed device which may be applied without structural change to the bolt and a slight structural change to the nut, and which may be applied to nuts and bolts of various forms and sizes, and to nuts and bolts employed for various purposes.

With these and other objects in view the invention consists in certain novel features of construction as hereinafter shown and described and then specifically pointed out in the claims.

The improved device may be applied to nuts and bolts employed for various purposes, and it is not designed therefore to limit the invention in any manner in this respect, but for the purpose of illustration the improved device is shown applied to the ordinary clamp or fish plates of a railway rail joint, and in the drawings illustrative of this embodiment of the invention—

Figure 1 is a side elevation of a portion of a railway rail joint with the improvement applied to the clamp bolts of the same, the nut being shown removed from one of the clamp bolts. Fig. 2 is a section on the line 2—2 of Fig. 1 looking in the direction of the arrow. Fig. 3 is a perspective view from beneath of the nut employed in the improved lock device. Fig. 4 is a view of the nut and the base member or washer, the nut and washer being in section on the line 4—4 of Fig. 1. Fig. 5 is a detached perspective view of the locking key. Fig. 6 is a detached perspective view of the washer or base member.

Corresponding and like parts are referred to in the following description and indicated in all the views of the drawings by the same reference characters.

The bolt is represented conventionally at 10 and the nut at 11, the bolt shown for the purpose of illustration being the ordinary clamp bolt of a railway rail joint, the rail being indicated conventionally at 12 and the clamp or fish plates at 13—14 with the bolt 10 extending through the three members 12—13—14. Surrounding the bolt 10 at its threaded end is a washer or base member 15 having pins 16 for entering suitable cavities in the body through which the bolt passes, for instance the clamp plate 13. The members 16 may be simply pins riveted in the washer member 15, or screwed or otherwise secured therein, and operate to prevent the rotation of the member 15 around the bolt. The member 15 is thus locked rigidly relative to the support 13, as will be obvious. In its outer face the member 15 is provided with a plurality of radial notches or recesses 17 preferably formed with inclined bottoms as shown in Fig. 6.

The nut 11 is formed with a radial socket 18 which is L-shaped transversely with one portion 18 extending in parallel relation to and opening through the bearing face of the nut, and the other portion 19 opening through one of the side walls of the nut and extending at right angles to the portion 18. An outwardly opening channel 20 leads from the portion 19 of the socket. Fitting within the socket 18 is a key device 21 having an arm 22 extending therefrom at one end. The key 21 is designed to lie initially flatwise in the portion 18 of the socket when first applied, or when the nut is to be rotated upon the bolt, and to be turned on edge with one portion within the portion 19 of the socket and the other edge engaging one of the recesses 17 of the member 15, as illustrated in Fig. 4, and thus locking the nut firmly to the member 15. By this simple arrangement, it will be obvious, that when the member 21 is located in the flat portion 18 of the recess the nut can be rotated upon its bolt to any required extent, and when the nut has thus been turned "home" the key can be turned on edge with its outer edge seated within the deeper portion 19 of the socket and engaged by its opposite edge with the nearest recess 17, and thus lock the nut in position as illustrated in Fig. 4. When the key is thus turned on edge the arm 22 is bent into the channel 20, as illustrated in Fig. 2, and operates to maintain the key member in its edge-wise position, and thus retain the nut in its locked relation to the bolt. Thus, the nut is firmly locked in position, and all danger of its retrograde movement and loosening is obviated, while at the same time the nut can be readily released by bending the arm 22 substantially into longitudinal alinement with the member 21 and thus permit the key to be turned into its flatwise position to release the nut.

The key 21 and its arm 22 are formed of bendable tough metal which will be sufficiently hard to resist the strains to which it will be subjected, while at the same time sufficiently ductile to permit the arm to be turned outwardly or inwardly a number of times to enable the device to be repeatedly used.

The improved device is simple in construction, can be inexpensively manufactured and applied, and effectually holds the nut from retrograde movement.

Having thus described the invention, what is claimed as new is:—

1. In a nut lock, a base member having a plurality of radial recesses and adapted to engage over a bolt and to be supported from rotation thereon, the nut having a socket opening through its bearing face and through one of the side walls, said socket being L-shaped transversely, and a locking key engaging initially in one portion of the socket and adapted to be turned into one of the radial recesses of the base and into the other portion of the socket.

2. In a nut lock, a base member having a plurality of radial recesses and adapted to engage over a bolt and to be supported from rotation thereon, a nut having a socket formed with a portion parallel to its bearing face and a portion at right angles to its bearing face, said nut having a channel communicating with said socket, and a locking key engaging initially in the parallel portion of the socket and adapted to be turned into one of the radial recesses of the base and into the right angled portion of the socket, said locking key having an arm adapted to be bent into said channel.

In testimony whereof I affix my signature in presence of two witnesses.

JOHN T. WICKER. [L. S.]

Witnesses:
 DAN MILLS,
 D. R. COLE.

Copies of this patent may be obtained for five cents each, by addressing the "Commissioner of Patents, Washington, D. C."